United States Patent [19]

Sinibaldi et al.

[11] Patent Number: 5,771,232
[45] Date of Patent: Jun. 23, 1998

[54] EXPANDABLE LOCAL INTER-SYSTEM BUS ARCHITECTURE IN A MULTIPLEXED ENVIRONMENT

[75] Inventors: John Claude Sinibaldi, Pompano Beach; Baiju Dhirajlal Mandalia, Boca Raton, both of Fla.; Gordon Taylor Davis, Raleigh, N.C.; Lawrence Paul Andrews, Boca Raton, Fla.; Robert Eugene Landa, Boca Raton, Fla.; Joe Fletcher Jones, Jr., Boca Raton, Fla.; Willie James Johnson, Plantation, Fla.

[73] Assignee: International Business Machines Corporation, Armonk, N.Y.

[21] Appl. No.: 518,215

[22] Filed: Aug. 23, 1995

[51] Int. Cl.$^6$ .............................. H04J 3/12; H04L 12/02
[52] U.S. Cl. ............................................ 370/384; 370/466
[58] Field of Search ................................. 370/58.1, 58.2, 370/67, 77, 85.9, 85.11, 384, 385, 466, 467, 522

[56] References Cited

U.S. PATENT DOCUMENTS

| | | |
|---|---|---|
| 4,837,677 | 6/1989 | Burrus, Jr. et al. . |
| 4,991,169 | 2/1991 | Davis et al. . |
| 5,237,572 | 8/1993 | Badaoui et al. . |
| 5,291,614 | 3/1994 | Baker et al. . |
| 5,349,579 | 9/1994 | Madonna et al. .................. 370/58.2 |
| 5,396,536 | 3/1995 | Yudkowsky . |

OTHER PUBLICATIONS

ISDN Primary Rate Interface with Multiple Protocol Support and Scalable Performance, TDB n11 04–92 pp. 401–404, Saalmueller, J., Germany Disclosure #: GE8–91–0143.

ISDN Port Adapter, G. T. Davis, Oct. 13, 1994, pp. 1 –16.

Dialog(R) File 351:DERWENT WPI, 1995 Derwent Info Ltd., (Item 6 from file: 351), WPI Acc No: 90–368384/49, Patent Assignee: NORAND CORP, Author: K.K. Cargin, et al., US 4972463 A, Abstract.

Dialog(R) File 347:JAPIO(Item 1 from file: 347), Pub. No.: 05–292154 [JP 5292154 A], Published: Nov. 5, 1993(19931105)N. Kenji, et al, Applicant: DIGITAL KK[491412](a Japanese company or Corporation) Appl. No: 03–284510 [JP 91284510] Filed: Oct. 30, 1991 (19911030) Abstract.

*Primary Examiner*—Melvin Marcelo
*Attorney, Agent, or Firm*—Richard A. Tomlin; Michael J. Buchenhorner

[57] ABSTRACT

In an communication system including a computer system comprising a digital signal processing adapter for performing a-set of tasks, and a E-1 port for providing and receiving time division multiplexed (TDM) signals in accordance with a first inter-system communication protocol, such as the E-1 or T-1 protocols, a communication subsystem, for coupling to the IP system. The communication subsystem includes an E-1 link for coupling to the first I/O port, and for providing and receiving TDM signals in accordance with the E-1 or T-1 protocols. The subsystem further includes a digital signal processor adapter, coupled to the second I/O port, for enhancing processing capability of the digital signal processing resource; and a third I/O port, coupled to the digital signal processor circuit, for providing and receiving signals in accordance with the first or a second inter-system communication protocol.

18 Claims, 6 Drawing Sheets

EXPANDABLE LOCAL INTER-SYSTEM BUS ARCHITECTURE IN A MULTIPLEXED ENVIRONMENT

TECHNICAL FIELD

The present invention relates generally to communications systems, and more specifically to a communications system for performing real-time all-digital conversions of signals relative to channels of a digital pulse code modulated (PCM) carriers such as the T-1 or E-1 so as to process information in forms associated with remote end user terminal and modem equipment.

BACKGROUND OF THE INVENTION

The advent of digital communications systems, such as systems using the integrated services digital network (ISDN) interface, has resulted in higher speed communications and the rate of the increased throughput capacity has outpaced the rate of improvement in processing power technology in computing (i.e., information processing) systems. Thus, it is likely that the data links connecting computer systems (or inter-system buses) will be faster than the computers being linked.

U.S. Pat. No. 4,991,169 by G. Davis et al, entitled "Real Time Digital Signal Processing Relative to Multiple Digital Communications Channels" (hereby incorporated by reference), disclosed a multiple digital signal processor (DSP) system that provides real time links between multiple time division channels of a digital carrier system (e.g., T1 or E1). The data being processed can be in different digital forms (e.g. pure digital and digitized analog or digitized voice) and is adapted to diverse terminal equipment of users remotely linked to the carrier system via the switched public network (PSTN). Thus a need exists for a communication subsystem that enhances the processing power for the computer system in a manner that helps the user keep up with the increasing processing speeds required by improving communications systems.

SUMMARY OF THE INVENTION

Briefly, in accordance with the invention, a communication subsystem provides enhanced processing capability for an information processing (IP) system comprising a digital signal processing resource for performing a set of tasks, and a first input/output (I/O) port for providing and receiving multiplexed signals in accordance with a first inter-system communication protocol. The communication subsystem comprises (1) a second I/O port for coupling to the first I/O port, and for providing and receiving TDM signals in accordance with the first inter-system communication protocol; (2) digital signal processor means, coupled to the second I/O port, for enhancing processing capability of the digital signal processing resource; and (3) a third I/O port, coupled to the digital signal processor circuit, for providing and receiving signals in accordance with the first or a second inter-system communication protocol.

DESCRIPTION OF THE ILLUSTRATIVE EMBODIMENTS

The system described in U.S. Pat. No. 4,991,169 (i.e., an information processing system having a DSP resource providing real time links between multiple time division channels of a digital carrier system) can be expanded by increasing the number of signal processors with minimal cost. Specifically, the Network E1 interface of that system can be used to communicate to another adapter via a local E1 link or L-E1 bus, with additional processors which in turn can further process this data in various forms. The additional cards are contained within the same subsystem with an external parallel bus interface for communication to a Host processor.

In a preferred embodiment, a communications subsystem for a Industrial Computer which provides modem functions within an ISDN primary rate interface. One subsystem consists of two ISDN primary rate interfaces, with each interface supporting up to 30 connections to remote analog modems at data rates up to 14,400 bits per second. Alternately, each of the 60 connections may make use of the full ISDN B channel bandwidth of 64 Kilobits per second when communicating with remote digital devices.

Figure 1:
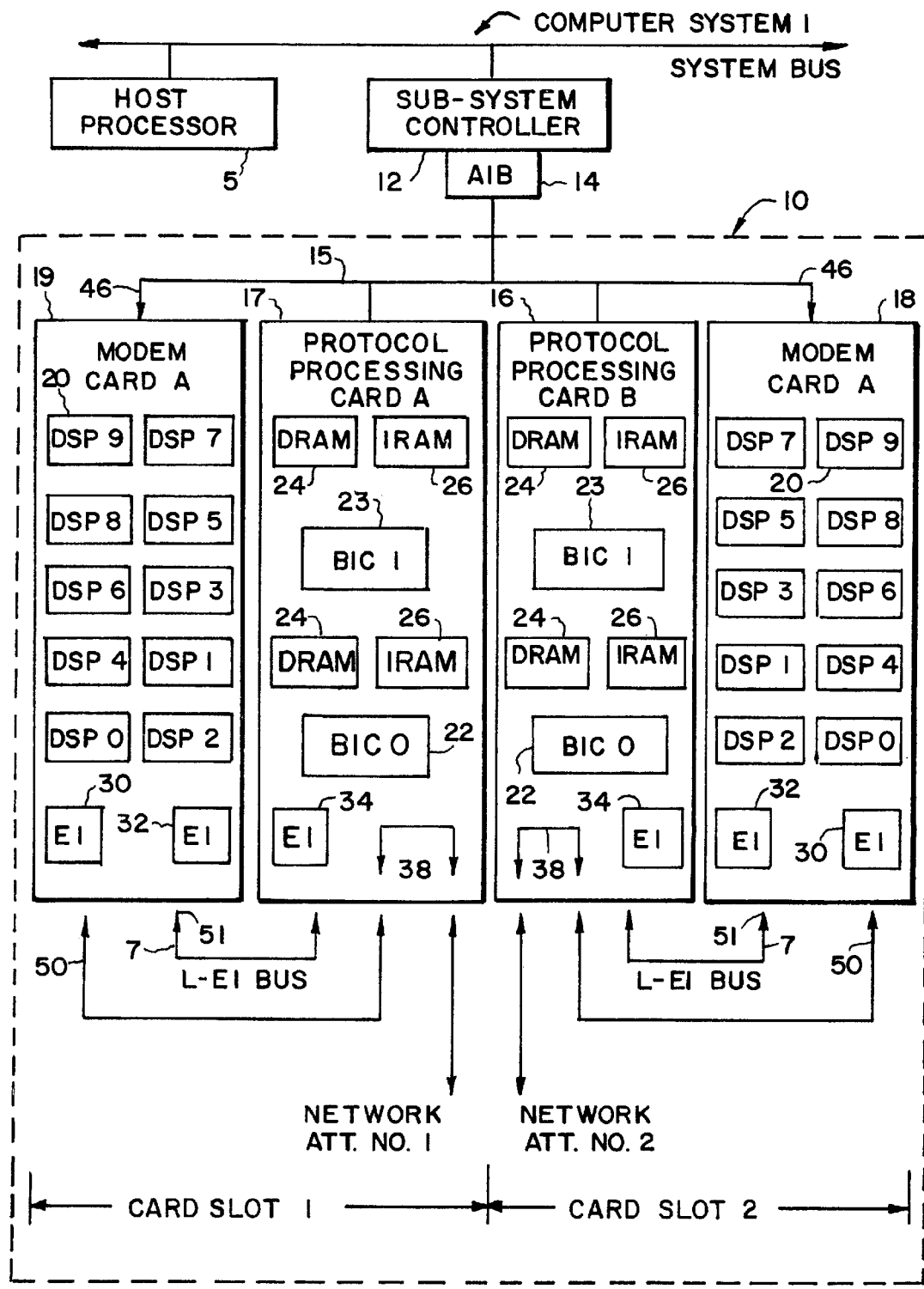
FIG. 1 is a diagram of a communications Subsystem in accordance with a preferred embodiment.

Referring to FIG. 1, there is illustrated a system 1, which includes a host processor 5, coupled to a system bus (e.g., a Microchannel or Peripheral Component Interconnect bus), a subsystem controller card 12, and a subsystem 10, coupled to the system bus via the subsystem controller 12 and an adapter interface board (AIB) 14. The AIB 14 translates the subsystem controller 12 (e.g., an Artic 960 controller) internal bus (not shown) into the inter-card connection bus 15 used by the subsystem 10. The subsystem 10 comprises two protocol processing cards 16 and 17, two modem cards 18, 19, and a flex circuit cable 15 connecting the cards. The subsystem Controller 12 may be packaged with the AIB 14 in one card shroud which is installed in the system 1. Each protocol processing card (16 and 17) is packaged with a modem card in a common shroud to make one ISDN port. Two of these ISDN ports are installed in the expansion chassis and are connected to the subsystem controller via the flex circuit cable 15.

Specifically, the DSP subsystems 20 on each Modem Card can provide modem functions from 75 bits per second (bps) to 14400 bps for each of thirty Bearer (B) channels within the ISDN port. Each DSP 20 can service any number of modems (up to three in the preferred embodiment). Modems at higher bit rates are possible with additional algorithm coding and possibly DSPs with higher MIPS and memory addressability. All ten DSP subsystems 20 share two Time Division Multiplexed (TDM) ports 50 and 51, and drop/insert data on their assigned time-slots. The TDM port connected to the TDM bus contains 32 Timeslots (E1). Timeslot 00 is used for the TDM frame synchronization and Timeslot 16 is used for signaling. (See Fascicle III.5—Rec. I.412, CCITT specification).

There are two Dual DSP Chips 22 and 23 (BIC0 and BIC1) on each Protocol Processing Card 16 and 17, each processing various protocols for 16 channels. These include, but are not limited to, the Link Access Protocols (LAP) LAP-B, LAP-D, LAP-M, V.42, MNP, with other proprietary protocols.

The two major units making up the ISDN Port Adapter 10 are the Protocol Processing Card 16 and 17 and the Modem Cards 18 and 19. Their relationship to the Sub-system Controller 12 is illustrated in FIG. 1. Details of this controller are not relevant to the invention.

The Protocol Processing Card Functional Description

The Protocol Processing Cards 16 and 17 are based on the ISDN adapter card discussed in U.S. Pat. No. 4,991,169, with several modifications to extend its protocol processing capabilities. See U.S. Pat. No. 4,991,169 (Real Time Digital Signal Processing Relative to multiple Digital Communications Channels).

Figure 2:
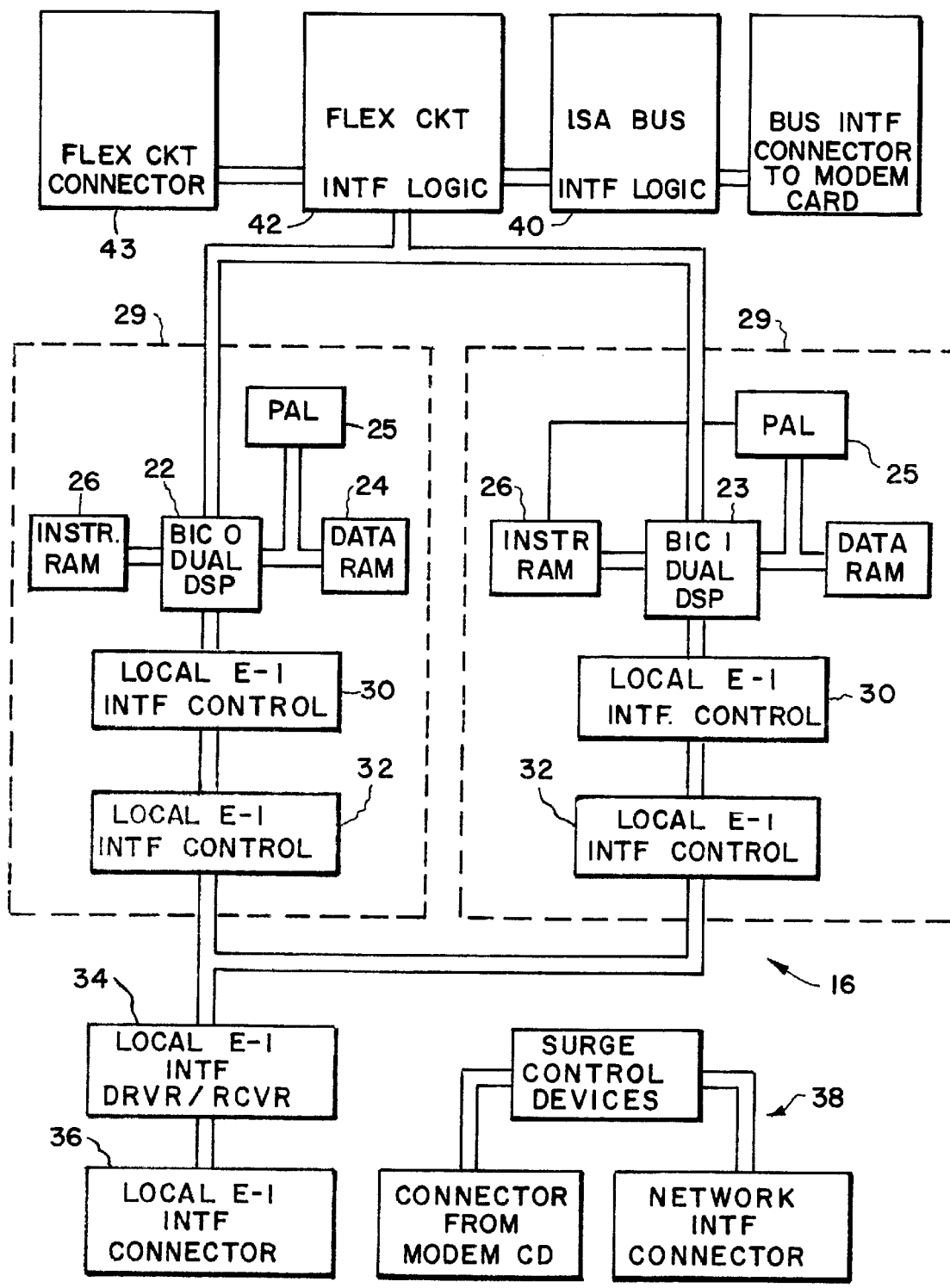
FIG. 2 is a block diagram of a protocol processing card in accordance with a preferred embodiment.

Referring to FIG. 2, the functional elements of the Protocol Processing Cards 16 and 17 are illustrated. Note that the cards 16 and 17 are identical except that they are numbered separately to distinguish their physical location. The Protocol Processing Card includes two DSP subsystems 29, each of which includes the following components:

(1) a Bus Interface Chip (BIC), a Dual DSP ASIC module 28;

(2) 64K×27 high-speed static RAM for Instruction storage 26;

(3) a 128K×18 high-speed static RAM for Data storage 24;

(4) a PAL logic chip 25 for controlling paged access to RAM;

(5) a T-1 Interface Logic module 30; and (6) a Primary Rate Framer chip (e.g., a Brooktree 8070) 32.

Additional functional elements on the Protocol Processing Card (16 or 17) include:

(1) a Local E-1 Interface (e.g., a Brooktree 8069) 34;

(2) Bus Buffers for Interface to Flex cable connection to Sub-system Controller combined with a PAL logic chip for bus translation function;

(3) a Sub-system Controller bus to ISA bus 42; and (4) a surge protection and connector for Network Interface driven from Modem Card 38.

The Protocol Processing Card DSP Sub-system

Each DSP Sub-system is identical to a DSP Sub-system on the adapter of U.S. Pat. No. 4,991,169, with the exception of the PAL logic chip 25, which adds support for additional RAM via paging registers which effect address translation. This increases the addressable Data Ram needed for the layered protocols such as the Link Access Protocols (Layer 2 of the OSI model). The BIC module contains two IBM Digital Signal Processors (ISP Version 5.0) which time share the same Data and Instruction RAM. See U.S. Pat. No. 4,991,169 for details of this DSP sub-system.

For the Protocol Processing Card 16 there will be 128K words of Data RAM memory. Memory paging will be processed externally to the BIC module 22 or 23 in a PAL module 25. Data RAM Paging can be independently controlled for each DSP as well as for burst Direct Memory Access (DMA) transfers to and from the Sub-system Controller 12. This memory is used to implement protocol functions for 16 channels. A Real Time control program (DSP Kernel) will select the channel area according to the channel process which is currently active.

In an E1 telephony interface, a Time-slot 00 is used for signaling and control information across the digital network. The L-E1 bus 7 is also a standard E1 interface. On the Local E1 or L-E1 bus 7, timeslot 00 will be used to pass information about network signaling between the Modem Card 18 or 19 and the Protocol Processing Card 16 or 17 as well as other status.

The Local E-1 Interface

Each of the DSP sub-systems 29 uses a separate primary rate framer chip (e.g., Brooktree 8070) 32 the same way that the prior art did. The two DSP sub-systems share a primary rate analog interface chip (e.g., a Brooktree 8069) 34, along with impedance matching components and transformer which make up the local E-1 interface. This LE1 interface is routed through connector 36, and provides the main functional communications path between the Protocol Processing Card 16 and 17 and the Modem Card 18 and 19 respectively.

Interrupt Monitoring

The DSP sub-systems 29 uses a spare input to monitor an interrupt line from the Modem Card 18 and 19. When one of the ten DSP subsystems 20 on a Modem Card activates the interrupt, the occurrence is latched in a network interface status register, and the INT0 interrupt is issued to a DSP processor within the DSP sub-system 29. In the preferred embodiment, the Protocol Processing Card 18 or 19 will communicate this event to the Sub-system Controller 12 since it has no direct path back to the Modem Card to respond to the interrupt.

The Flex Cable Interface

Bus Buffers are required for the Interface to the Flex cable 15 connection to Sub-system Controller 14. This design is identical to that used on the adapter of U.S. Pat. No. 4,991,169.

The Bus translation logic

In addition to accessing the DSP sub-systems on the Protocol Processing Card 16 and 17, the Sub-system Controller 12 must also access each of the 10 DSP sub-systems 20 on the Modem Card 18 and 19. The native interface of these DSP chips is an industry standard PC bus (ISA) 54. A PAL logic chip 40 is added to the Protocol Processing Card to translate bus control signals from the Flex Cable bus 15 into the standard ISA bus format.

Each of the ten DSP sub-systems 20 on the Modem Card 18 is assigned four addresses within the I/O address space of the Sub-system Controller 12. A read cycle to a DSP register on the Modem Card requires the Sub-system Controller to execute two read cycles because the fixed timings on the ISDN AIB I/O cycles reach the end of a read cycle before the DSP can provide valid data. This is due to the fact that the DSP Sub-system 20 has a bus cycle that is half as fast as the Sub-system Controller 12. The first read cycle will then transfer the data from the DSP into an intermediate holding register in the bus translation logic, and the next read cycle will transfer that data from the holding register to the Sub-system Controller.

The Network Interface

Although most of the Network Interface components are on the Modem Card (SPX) 18, the network interface connector and surge protection devices 38 are mounted on the Protocol Processing Card (SP2P) 16. In the preferred embodiment, this distribution of network interface components was necessary because the Protocol Processing Card (SP2P) must include the metal connector bracket to support the flex cable connector. The Connector in 38 routes the required transmit and receive signals between Modem Card (SPX) and Protocol Processing Card (SP2P).

The Modem Card Functional Description

Figure 3:
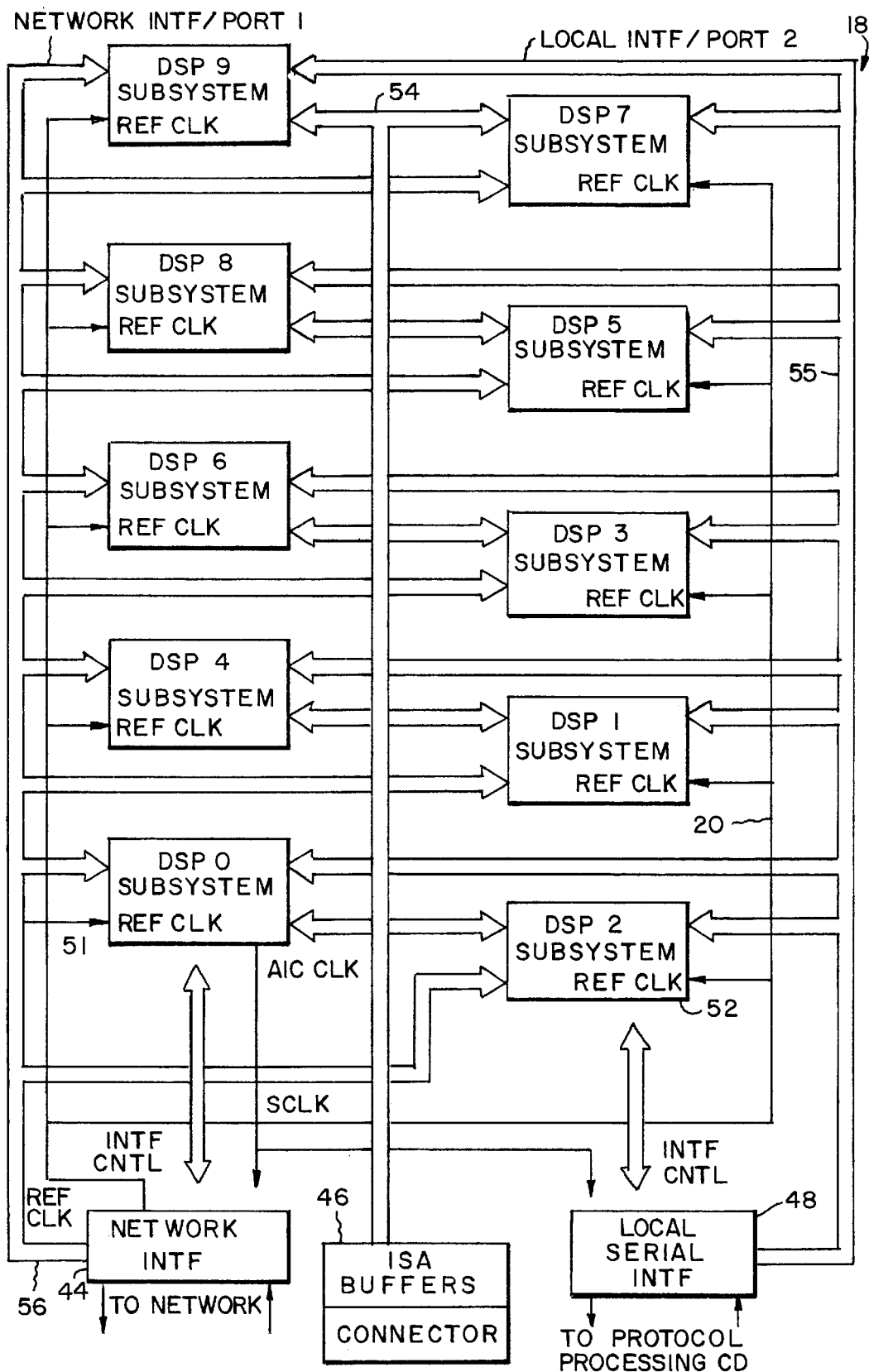
FIG. 3 is a block diagram of a Modem processing card in accordance with a preferred embodiment.

The main functional components of the Modem Cards 18 and 19 are illustrated in FIG. 3. It includes ten DSP sub-systems 20, an ISDN primary rate network interface 44, a local E-1 interface 48 which connects to the Protocol Processing Card 16, and interface buffers 46 for the ISA bus interface controlled by Sub-system Controller 12.

DSP sub-system#0 51 controls the initialization of the network interface 44, while DSP sub-system#2 52 controls the initialization of the local E-1 interface 48. See FIG. 4 for a description of each DSP Sub-system 20. Each DSP sub-system 20 has two ports 61 and 62 supporting various telecommunications devices, including several types of time-division multiplexed (TDM) interfaces. These ports are referred to as teleports, and are used to connect to the network interface components. All 10 DSP sub-systems connect to both the network interface 44 and the local E-1 interface 48 using these ports.

Teleport 1 of each DSP sub-system 20 is connected to the TDM bus 56 from the network interface framer, while Teleport 2 of each DSP sub-system is connected to the TDM bus 55 from the local E-1 framer. All 10 DSP sub-systems share in the implementation of the modems data pumps, with each sub-system providing up to three modem data pumps. Microcode executing in Sub-system 0 51 may also provide a transparent pass-through of time-slots 0 and 16 so the Protocol Processing Card can access call control information. The 10 DSP sub-systems 20 share an industry standard ISA bus 54 which allows the Sub-system Controller 12 to initialize the card, load microcode into each DSP sub-system memory 64, and communicate with each DSP during normal operation.

The Sub-system Controller can access four registers in each DSP sub-system:

System Control Register (XXX0);

System Address Register (XXX4);

System Data Register (XXX8); and

System Data Register Extension for Instruction RAM access (XXXA).

All ten DSP subsystems 20 use the same base address on the local bus ('003__'Hex), but the 4 registers are mapped separately for each DSP sub-system into Sub-system Controller I/O address space.

An additional I/O window is available in Sub-system Controller I/O space which allows the Sub-system Controller 12 to broadcast write to all ten DSP sub-systems 20 simultaneously. This allows for a "Broadcast Load" of the IRAM in all 10 SPX DSPs significantly reducing the time required for Code loading. The broadcast write function is especially useful in expediting the initialization of instruction and Data RAM since the application dictates that most of the data to be loaded is identical for all DSP sub-systems. This logic is contained in 40.

One of the ISA bus interrupts (SIRQ__A) can be used by all DSP sub-systems 20 to alert the Protocol Processing Card of error conditions on the Modem Card.

The Modem Card DSP Sub-system

Figure 4:
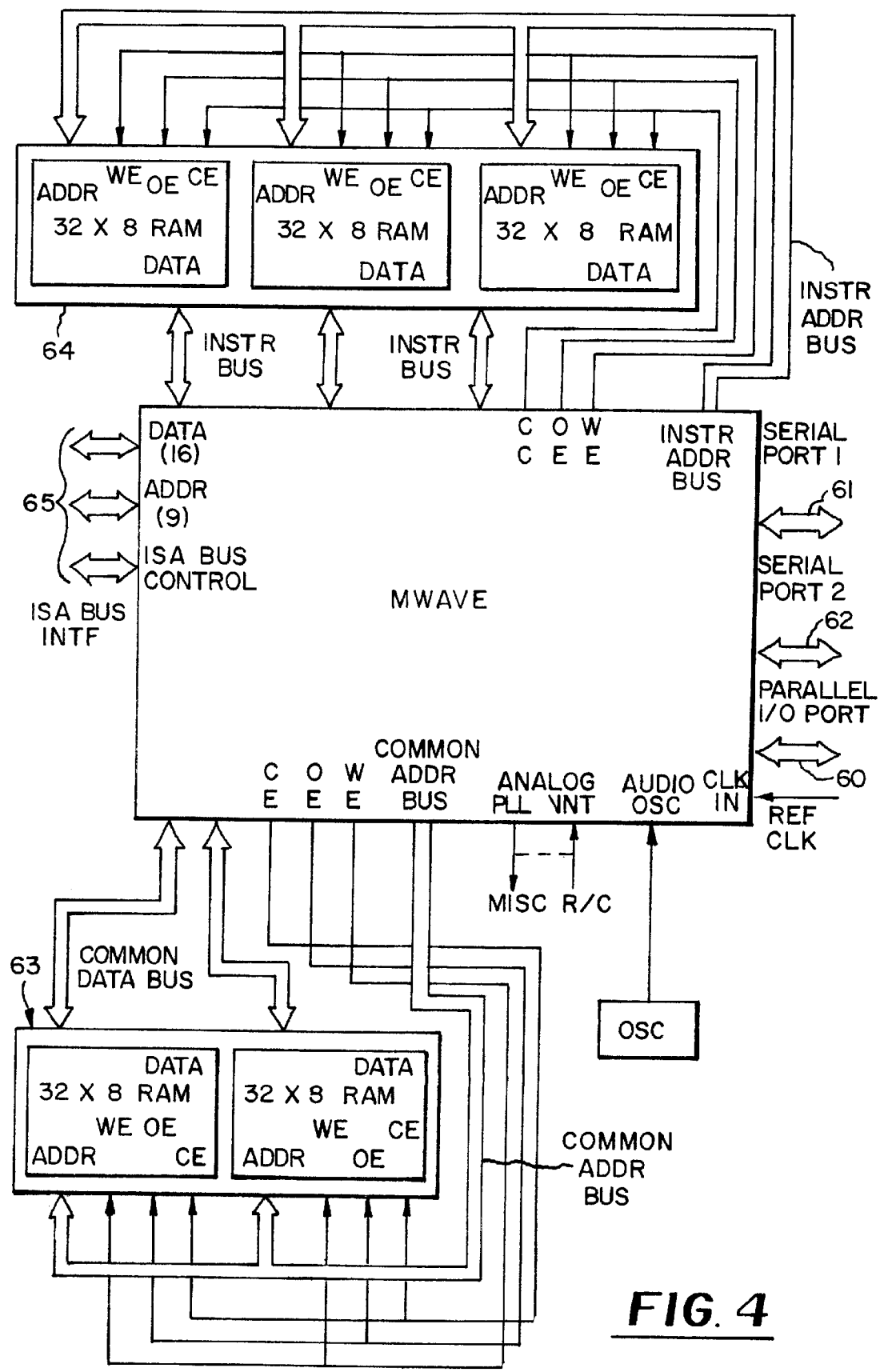
FIG. 4 is a block diagram of a DSP Subsystem in accordance with a preferred embodiment.

The DSP subsystem can be implemented with an Mwave DSP MDSP2780 and its associated high-speed static RAM as illustrated in FIG. 4. Ten of these DSP subsystems are packaged on the Modem Card as illustrated in FIG. 4. Each DSP sub-system 20 uses an internal clock generator to achieve a 24.58 MHz instruction cycle rate. See: "The Mwave System MDSP2780 Data Sheet" for further details of this DSP Sub-system.

Within the Modem Card 18 and 19, only a subset of the ISA bus system interface is required. The interface available for the Sub-system Controller to control the Modem Card is limited to slave I/O access to four registers. Most of the peripheral interfaces of the DSP chip 20 are also not required. Unused functions could be disabled and powered down via peripheral control and power management registers to minimize power consumption and avoid resource conflicts. These include: MIDI; Comm Port; Sound Blaster; CD Audio (DAC and ADC); ACI Port; Protocol Assist Logic; Digital Audio; and DMA Packet Controller.

The two teleports 61 and 62 will be used in the TDM mode, and the parallel I/O port 60 will be used by two of the DSP chips to control the network and local E-1 interfaces 44 and 48. (The other 8 DSP chips can disable the parallel I/O ports 60 since they are not needed.)

The Network Interface

Figure 5:
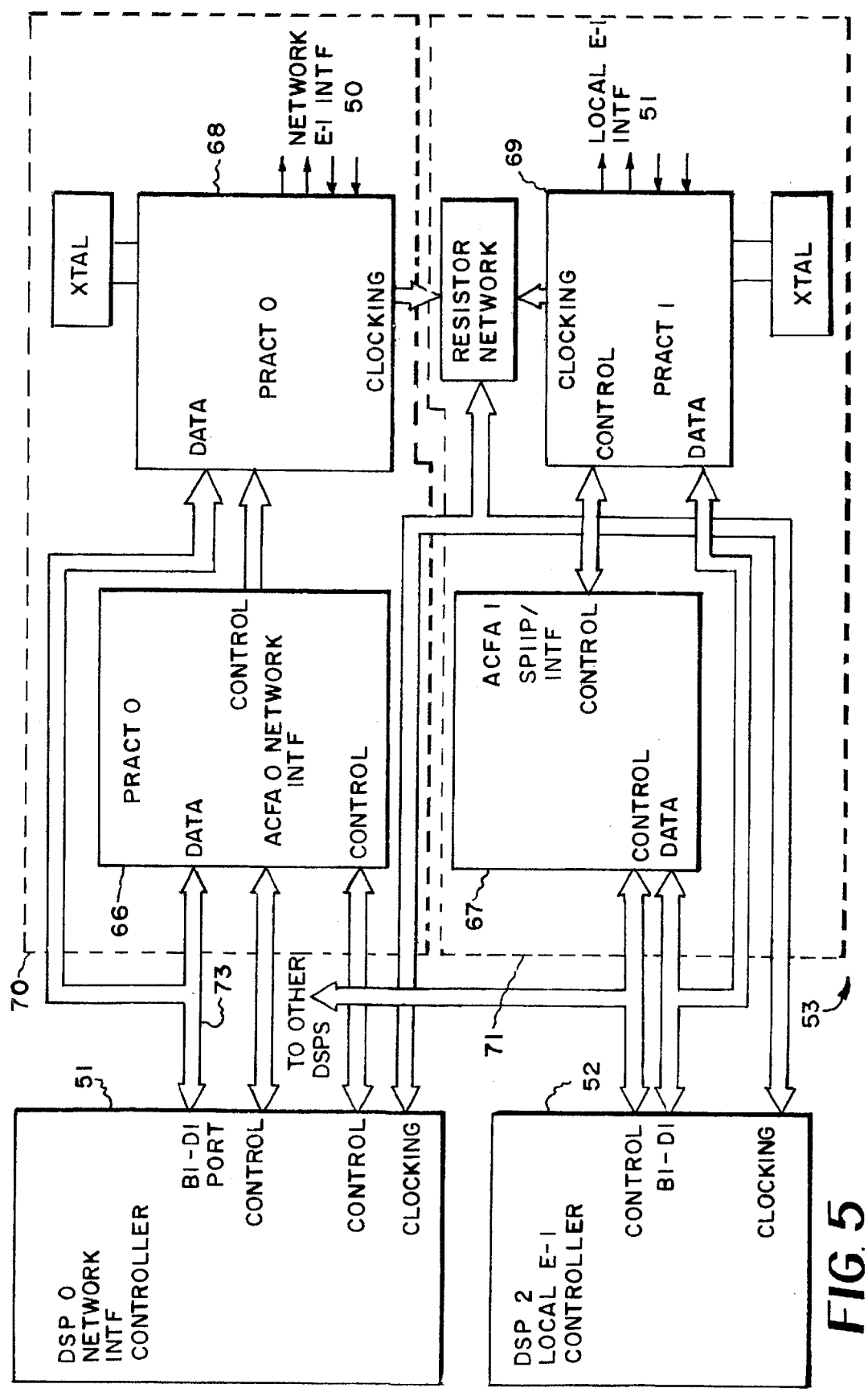
FIG. 5 is a block diagram of a Network Interface Control in accordance with a preferred embodiment.

FIG. 5 illustrates the details of the network Interface connection 70. The two primary components used in the network interface are the PEB 2035 Advanced CMOS Frame Aligner (ACFA) 66 , and the PEB 22320 Primary Rate Access Clock generator and Transceiver (PRACT) 68. Transformers, for receive and transmit circuits, along with termination resistors and diode clamps are included in the network interface circuit 70.

The serial transmit and receive lines 73 from the network interface 70 are connected to teleport 1 61 on each DSP 20. All 32 time-slots of this interface are directed to a single receive circular buffer and from a single transmit circular buffer in each DSP sub-systems DRAM 63. The time-slots will be aligned modulo 32 with the buffer pointers to enable DSP code to determine which time-slot is which. For example, if the DSP sub-system 20 only processes three time-slots, it will ignore receive data in other time-slot positions within the receive buffer. (DSP subsystems 4 and 9) must do minimal processing on an additional channel, 0 and 16, respectively, to provide a transparent pass-through of network signaling data for processing by the Protocol Processing Card (SP2P). Buffer locations associated with time-slots assigned to other DSPs must be loaded with a "1" in the most-significant bit. This will result in the serial transmit output being tri-stated, thus permitting the assigned DSP to control that time-slot.

DSP#0 51 is assigned the task of controlling the ACFA 66 and PRACT 68 chips. To accomplish this, the DSP 51 uses its parallel bi-directional I/O port as a data bus to read and write the registers in 66 and 68. Likewise, the DSP 51 uses its parallel output I/O port 60 to manipulate address and control lines which select specific registers in the ACFA 66 and 67 and PRACT for access. A read or write to an ACFA register requires a sequence of DSP instructions which will manipulate these I/O ports 60 to match the required timings for a ACFA I/O cycle. The DSP input I/O port is also available to poll signaling and error status from the ACFA.

DSP#0 51 will also generate the Frame Synchronization pulse (8 KHz) and a 4.096 MHz TDM system clock which are routed to the ACFA 66 for both the network interface and the local E-1 interface. These clocks are synchronized to the receive clock by a digital phase-locked loop in DSP#0 51. DSP#0 must be programmed with Teleport 1 in master mode in order to generate the Frame Synchronization pulse. Note that in this case, Master Mode refers only to sourcing of the Frame Synchronization pulse on the local TDM interface. Bit timing is extracted from the network interface receive signal to insure that the ISDN Port Adapter is synchronized to network timing. Teleport 2, as well as both Teleports on the other nine DSP sub-systems must be programmed in slave mode. Since the receive clock is derived from network timing by the PRACT chip 66, synchronizing the other clocks to it insures that the local E-1 interface will be synchronized to the network interface timing. The Frame Synchronization pulse is also redriven to a clock (the FSX pin) input for both Teleports of all DSP chips. This Frame Synchronization pulse insures that all ten DSP chips are synchronized to the beginning of each frame on both TDM interfaces.

The Local E-1 Interface The local E-1 interface 48 is the main functional connection between the Modem Card 18 and Protocol Processing Card 16. Demodulated data is combined with control information on each time-slot of this link to allow each modem data pump (on Modem Card) to communicate with the corresponding protocol code running on Protocol Processing Card 16. Unused bandwidth in each time-slot is padded with synchronization patterns so that specific data and control elements can be identified.

The data transmitted across the local E-1 interface 48 can be in two forms. In one form the data is encapsulated in an LE1 frame. This frame contains A Start flag, Command field, Data count field, and a Data field. In this form, data processed on the SPX card is sent back to the protocol processing card 16 or 17 with appropriate commands and status. In the other form, raw unprocessed data is sent over the LE1 bus at the full 64KBPS rate. This is done by a firmware By-Pass task on the modem adapter 18 when no processing is needed.

Timing for the local E-1 Interface is derived from timings at the Network Interface 70 to insure consistent data transfer. As with the Network Interface 70, the local E-1 interface drives a TDM connection to all ten DSP chips (using Teleport 2 62 on each DSP). DSP#2 52 is assigned the task of controlling the local E-1 interface 48. Its connection to the ACFA 67 and PRACT 69 chips of the local E-1 interface 71 is similar to the connection of DSP#0 51 to the Network Interface chips (illustrated in FIG. 5). Clocking is the major difference in the connections, in order to insure that the local E-1 interface clocking is a slave to the clocks used in the Network Interface. Surge protection is not required on the local E-1 interface, but a transformer is still used to provide isolation between the two cards.

In an alternate environment, both the network interface port and the local E-1 port on each of the DSPs may be configured to interface to only four of the 32 timeslots, by using additional logic to generate a unique frame sync pulse for each DSP at the beginning of the first time-slot it is supposed to process, and the gating the 2.048 MHz bit clock to each DSP to run during the 4 timeslot window for that DSP. This implementation has the advantage of minimizing Data RAM space required for I/O buffering since only four timeslots must be included in the I/O buffers for each DSP, instead of generating I/O buffers with all 32 timeslots as described in the first alternative. This benefit comes at the expense of the added logic to generate individual clocks and frame sync pulses for each DSP.

The ISA Bus Interface

The DSP subsystem 20 has a full ISA Bus interface 65 imbedded. A sub-set of this interface is mapped into Sub-system Controller I/O space so the Sub-system Controller (Artic 960) can initialize the Modem Card 18. This interface is translated into the bus interface discussed in U.S. Pat. No. 4,991,169 from the Sub-system Controller AIB interface board 14 using a PAL logic chip on the Protocol Processing Card 16. In the preferred embodiment, only I/O Read and I/O Write functions are supported in the connection to the Sub-system Controller 12 in order to simplify that interface design.

The ISA data bus 54 is split into two local data busses (each with separate buffering) because of loading considerations. One bus is routed to odd numbered DSPs, and the other is routed to even numbered DSPS. The I/O Channel Ready signal is also split between odd and even DSPs to minimize the net capacitance each DSP must drive. All other required ISA bus signals are sourced from the Protocol Processing Card 16, and are bussed to all ten DSP subsytems 20. Only three address lines are driven to select the desired register access within each DSP. The remaining address lines are strapped to select I/O decodes within the range of '0030' to '003E' Hex. Since all DSPs are strapped with the same address range, separate AEN signals are created by PAL logic on the Protocol Processing Card (SP2P) to select the desired DSP(s) based on a full address from the Sub-system Controller 12. Four registers are accessible in each DSP chip: (1) System Control Register; (2) System Address Register; (3) System DS/IS Access Register (Data to or from RAM); and System IS Access (Data extension to or from Instruction RAM).

Although Bus Master DMA and multiple channels of interrupt are included in the DSP interface design, these functions are not enabled in the connection to the Sub-system Controller (Artic 960). In the preferred embodiment, one ISA bus interrupt has been wired to interrupt the BIC module on the Protocol Processing Card 16, to provide communications between the two cards. SIRQ_A can be driven by any of the 10 DSP chips using open drain drivers. The signal is normally high (pull-up resistor) and is pulsed low to generate an interrupt. Protocol Processing Card 16 must stretch the pulse so that its BIC module can detect it and respond accordingly. The Sub-system Controller 12 must be involved indirectly in processing each of these interrupts, since it is the only one which can determine which DSP generated the interrupt. The Sub-system Controller (Artic 960) must also clear the interrupt logic in the Modem Card DSP 18 to enable future interrupts. The Protocol Processing Card 16 must therefore communicate the interrupt event to the Sub-system Controller 12 to complete the link.

Modem Card Extension for further increased Capability

Figure 6:
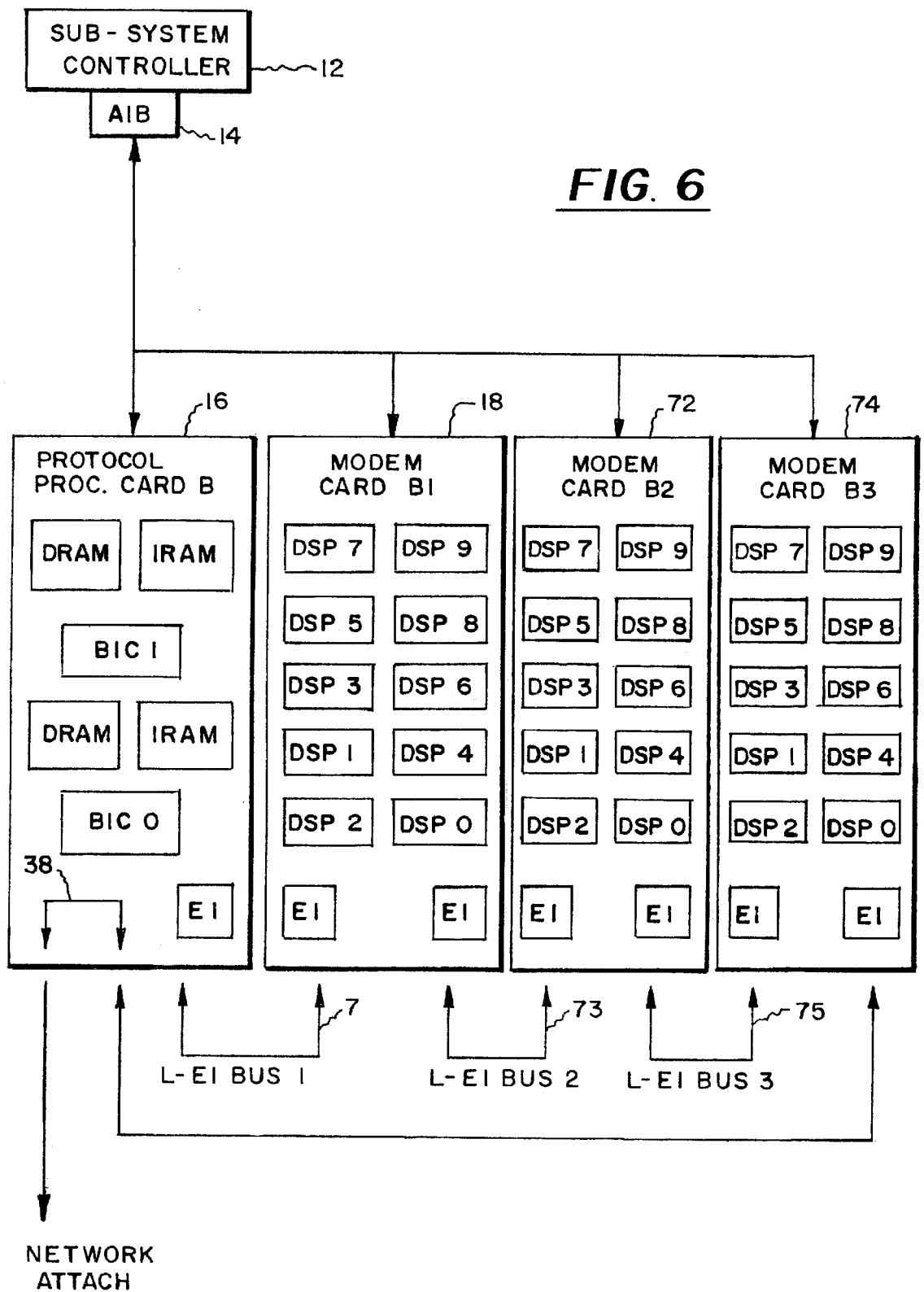
FIG. 6 is a diagram of an extended communications Subsystem for providing additional processing power in accordance with a preferred embodiment.

Referring to FIG. 6, there is illustrated an enhanced subsystem, that comprises a Sub-system Controller 12, a Protocol Processing Card 16, and three modem cards 18, 72 and 74, and a flex circuit cable connecting the cards with three local E1 busses 7, 73, and 75 respectively. This configuration will allow one timeslot per DSP Subsystem 20, permitting even more processing power per timeslot. This allows for Modem functions of up to 28800 bps, as well as other computation intensive algorithms.

What is claimed is:

1. In an information processing (IP) system comprising a digital signal processing resource for performing a set of tasks and having a first input/output (I/O) port for providing and receiving multiplexed signals in accordance with a first inter-system communication protocol, a communication subsystem, for coupling to the IP system, said subsystem comprising:

digital signal processor means, having a second I/O port, for enhancing processing capability of the digital signal processing resource;

said second I/O port for coupling to the first I/O port, and for providing and receiving TDM signals in accordance with the first inter-system communication protocol; and a third I/O port, coupled to the digital signal processor means, for providing and receiving signals in accordance with the first or a second inter-system communication protocol.

2. The communication subsystem of claim 1 wherein the digital signal processing resource performs a set of tasks including protocol processing;

the digital signal processor means enhances the processing capability of the digital signal processing resource by performing modem function processing; and the first inter-system communication protocol is in accordance with one of the protocols E-1 or T-1 and the second protocol is in accordance with one of the protocols T-1 or E-1.

3. The communication subsystem of claim 1, wherein the digital signal processor means enhances the processing power of the digital signal processing resource performing a subset of the set of tasks performed by the digital signal processing resource.

4. The communication subsystem of claim 1, wherein the digital signal processor means comprises a digital signal processor integrated circuit.

5. The communication subsystem of claim 2, wherein the digital signal processor means comprises a plurality of digital signal processor integrated circuits and a bus for coupling with each digital signal processor integrated circuit, each digital signal processor integrated circuit is allocated to processing of at least one respective channel of a plurality of TDM channels of the communication subsystem.

6. The communication subsystem of claim 1, wherein the first input/output (I/O) port includes means for coupling to an primary integrated services digital network.

7. The communication subsystem of claim 1, wherein the third input/output (I/O) port includes means for coupling to an primary integrated services digital network.

8. An information processing (IP) system comprising:
   a host processor;
   a digital signal processing resource coupled to the host processor for performing a set of tasks and having a first input/output (I/O) port for providing and receiving multiplexed signals in accordance with a first inter-system communication protocol;
   an enhancement communication subsystem for enhancing the digital processing resource in the IP system, said subsystem comprising:
      first coupling means for coupling a second I/O port to the first I/O port for providing and receiving TDM signals in accordance with the first inter-system communication protocol;
      digital signal processor means coupled to the second I/O port, for enhancing processing capability of the digital signal processing resource; and
      second coupling means, coupling an output sort to the digital signal processor means, for providing and receiving signals in accordance with the first or a second inter-system communication protocol.

9. The IP system of claim 8, wherein the first inter-system communication protocol is in accordance with the E-1 protocol.

10. The IP system of claim 8, wherein the first inter-system communication protocol is in accordance with the T-1 protocol.

11. The IP system of claim 8, wherein the digital signal processor means enhances the processing power of the digital signal processing resource performing a subset of the set of tasks performed by the digital signal processing resource.

12. The IP system of claim 8, wherein the second communication protocol is in accordance with the E-1 protocol.

13. The IP system of claim 8, wherein the second communication protocol is in accordance with the T-1 protocol.

14. The IP system of claim 8, wherein the digital signal processor means comprises a digital signal processor integrated circuit.

15. The IP system of claim 8, wherein the digital signal processor means comprises a plurality of digital signal processor integrated circuits and a bus for coupling with each digital signal processor integrated circuit.

16. A system for providing telecommunication services between a host processor and a plurality of diversely equipped remote user terminals linked to the host processor through a public switched telephone network comprising:
   a first time division multiplexed high-speed digital carrier trunk providing access for the host processor to the network;
   all digital protocol processing means coupling the host processor with a local multiplexed high-speed digital carrier trunk for exchanging signals with time division channels on the local trunk and for exchanging signals with the host in a form compatible with the processing requirements of the host, but incompatible with signalling requirements of the terminals;
   all digital modem processing means coupling the local trunk to the first trunk for exchanging signals with time division channels on said first trunk in diverse signal forms compatible with requirements of the remote user terminals and for exchanging signals with time division channels on said local trunk; and
   said protocol processing means and said modem processing means operating in response to respective programmable instructions for converting signals in transit between the host processor and the time division channels of the first trunk into forms respectively compatible with signalling requirements of the user terminals and processing requirements of the host.

17. A system for providing telecommunication services between a host processor and a plurality of diversely equipped remote user terminals linked to the host processor through a public switched telephone network comprising:
   a plurality of first time division multiplexed high-speed digital carrier trunks providing access for the host processor to the network;
   a plurality of all digital protocol processing means, each coupling the host processor with a respective local multiplexed high-speed digital carrier trunk for exchanging signals with time division channels on the respective local trunk and for exchanging signals with the host in a form compatible with the processing requirements of the host, but incompatible with signalling requirements of the terminals;
   a plurality of all digital modem processing means, each coupling a respective one of the local trunks to a respective first trunk for exchanging signals with time division channels on said respective first trunk in diverse signal forms compatible with requirements of the remote user terminals and for exchanging signals with time division channels on said respective one local trunk; and
   said protocol processing means and said modem processing means operating in response to respective programmable instructions for converting signals in transit between the host processor and the time division channels of respective first trunks into forms respectively compatible with signalling requirements of the user terminals and processing requirements of the host.

18. A system for providing telecommunication services between a host processor and a plurality of diversely equipped remote user terminals linked to the host processor through a public switched telephone network comprising:
   a first time division multiplexed high-speed digital carrier trunk providing access for the host processor to the network;

all digital protocol processing means coupling the host processor with a local multiplexed high-speed digital carrier trunk and operating in response to programmable instructions for exchanging signals with time division channels on the local trunk and for exchanging signals with the host in a form compatible with the processing requirements of the host but incompatible with signalling requirements of the terminals;

all digital modem processing means coupling the local trunk to the first trunk and operating in response to programmable instructions for exchanging signals with time division channels on said first trunk in diverse signal forms compatible with requirements of the remote user terminals and for exchanging signals with time division channels on said local trunk; and said protocol processing means and said modem processing means operating in response to respective programmable instructions for converting signals in transit between the host processor and the time division channels of the first trunk into forms respectively compatible with signalling requirements of the user terminals and processing requirements of the host.

* * * * *